United States Patent
Ancora et al.

(10) Patent No.: US 8,804,863 B2
(45) Date of Patent: Aug. 12, 2014

(54) PROCESS FOR ESTIMATING THE CHANNEL FROM THE PSS SIGNAL IN A LTE COMMUNICATION NETWORK, AND RECEIVER FOR THE SAME

(75) Inventors: Andrea Ancora, Nice (FR); Issam Toufik, Juan les pins (FR)

(73) Assignee: ST-Ericsson SA, Plan-les-Ouates (CH)

( * ) Notice: Subject to any disclaimer, the term of this patent is extended or adjusted under 35 U.S.C. 154(b) by 297 days.

(21) Appl. No.: 13/379,155

(22) PCT Filed: Jun. 18, 2010

(86) PCT No.: PCT/EP2010/003679
§ 371 (c)(1),
(2), (4) Date: Mar. 15, 2012

(87) PCT Pub. No.: WO2010/145832
PCT Pub. Date: Dec. 23, 2010

(65) Prior Publication Data
US 2012/0163503 A1    Jun. 28, 2012

(30) Foreign Application Priority Data

Jun. 19, 2009    (EP) .................................... 09368020

(51) Int. Cl.
*H04L 27/28*   (2006.01)
*H04L 27/06*   (2006.01)

(52) U.S. Cl.
USPC ........................... 375/260; 375/316; 375/340

(58) Field of Classification Search
CPC . H04L 5/0048; H04L 25/00; H04L 25/03955; H04L 27/2656; H04L 27/2675; H04L 27/2695; H04L 5/0007; H04L 5/0053; H04L 25/025; H04L 25/0256; H04W 24/02; H04W 36/30; H04W 56/00
USPC .......................................... 375/260, 316, 340
See application file for complete search history.

(56) References Cited

U.S. PATENT DOCUMENTS

| | | | |
|---|---|---|---|
| 2008/0240314 A1 | 10/2008 | Gaal et al. | |
| 2009/0232108 A1* | 9/2009 | Haghighat et al. | 370/336 |
| 2010/0182903 A1* | 7/2010 | Palanki et al. | 370/225 |
| 2012/0027110 A1* | 2/2012 | Han et al. | 375/260 |

OTHER PUBLICATIONS

International Search Report in corresponding International Application No. PCT/EP2010/003679 mailed on Sep. 10, 2010.

(Continued)

*Primary Examiner* — Don N Vo
(74) *Attorney, Agent, or Firm* — Patent Portfolio Builders PLLC (57) ABSTRACT

A Method for estimating the channel in a Long Term Evolution (LTE) communication system, said method involving the step of extracting a Primary Synchronization Signal (PSS) from a received signal and further involving the step of spanning said PSS based Least Square (LS) channel estimation on the 64 sub-carriers so as to facilitate the MMSE channel estimation. Preferably, the spanning is performed by means of an interpolation of the particular sub-carriers which are not allocated to said PSS (#-32, d.c.) The method involves the steps of: —Perform LS channel estimation on the 62 sub-carriers containing the PSS (40) —reconstruct the LS channel estimation on the 64 central sub-carriers by interpolating (41) on subcarriers not allocated to said PSS; —Apply (42) an Inverse DFT or Inverse Fast Fourrier Transform —Extract (43) the L first samples, with L corresponding to the length of the channel; —multiply (44) by $(F_L^H F_L + \sigma^2 C_h^{-1})^{-1}$ —Zero-pad (45) the resulting signal to length 64; —Apply (46) a DFT or an FFT.

15 Claims, 9 Drawing Sheets

(56) References Cited

OTHER PUBLICATIONS

Written Opinion of the International Searching Authority in corresponding International Application No. PCT/EP2010/003679 mailed on Sep. 10, 2010.

Satoshi Nagata, et al.; "Investigations of Synchronization Channel Sequences in OFDM Based Evolved UTRA Downlink"; IEEE 66th Vehicular Technology Conference; VTC-2007; Sep. 1, 2007; pp. 1390-1395; XP031147635; New York.

Park, H.G., et al.; "Efficient coherent neighbour cell search for synchronous 3GPP LTE system"; The Institution of Engineering and Technology Journal; vol. 44, No. 21; XP006031901; I Oct. 9, 2008; pp. 1267-1268.

Samir Omar, et al.; "Performance analysis of general pilot-aided linear channel estimation in LTE OFDMA systems with application to simplified MMSE schemes"; IEEE 19th International Symposium on Personal, Indoor and Mobile Radio Communications; Sep. 15, 2008; pp. 1-6; XP031371485; New Jersey, USA.

Xiaolin Hou, et al.; "Robust Channel Estimator for MIMO-OFDM systems with FPGA Implementation"; IEEE 14th Asia-Pacific Conference on Communications; XP031417979; Oct. 14, 2008; pp. 1-5; New Jersey, USA.

Branislaw M. Popovic, et al.; "Primary Synchronization Signal in E-UTRA"; IEEE 10th International Symposium on Spread Spectrum Techniques and Applications; ISSSTA 2008; XP031319050; Aug. 25, 2008; pp. 426-430; New Jersey, USA.

* cited by examiner

PRIOR ART

PROCESS FOR ESTIMATING THE CHANNEL FROM THE PSS SIGNAL IN A LTE COMMUNICATION NETWORK, AND RECEIVER FOR THE SAME

TECHNICAL FIELD

The invention relates to the field of wireless communication and more particularly to a process for estimating the channel based on the PSS signal in a LTE communication network, and a receiver for doing the same.

BACKGROUND ART

Digital wireless communications are being widely used throughout the world particularly with the latest development of the Orthogonal Frequency Division Multiplex (OFDM systems) and the last evolution, namely the so-called Long Term Evolution (LTE) systems.

When a User Equipment (UE) wishes to access an LTE network, it must initiate a cell search procedure consisting of a series of synchronization steps by which the UE determines time and frequency parameters particularly necessary for the purpose of demodulating the downlink and also for getting critical system parameters.

In LTE, the cell search procedure is based on the use of two particular synchronization signals being broadcast in each cell, namely the so-called Primary Synchronization Signal (PSS) and the Secondary Synchronization Signal (SSS).

Figure 1:
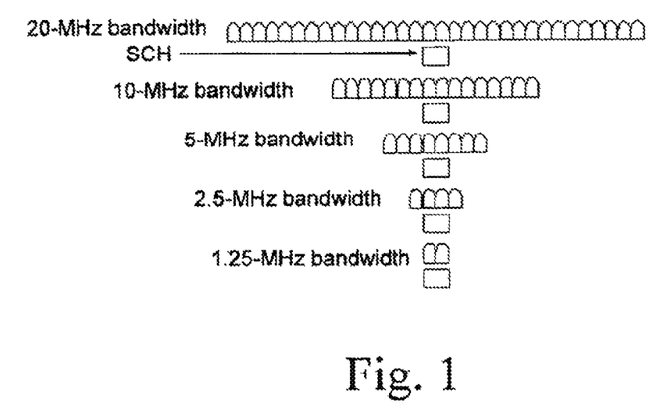
FIG. 1 illustrates the frequency allocation for synchronization signal in LTE.

The synchronization signals (PSS and SSS) are sequences of length 62 which are mapped to the central 62 sub-carriers (not including the d.c.) independently of the transmission bandwidth, as illustrated in FIG. 1.

Generally speaking, in LTE, the largest unit of time is the 10 ms radio frame, which is subdivided into ten 1 ms sub-frames, each of which being split into two 0.5 ms slots. Each slot comprises six to seven OFDM symbols in accordance with the length of the cyclic prefix. In the frequency domain, resources are grouped in units of 12 subcarriers and each block of 12 subcarriers, during one slot, is called a Resource Block (RB), the latter being divided into Resources Elements (RE) which lasts for one OFDM symbol.

The reader is invited to refer to the literature regarding LTE, and particularly to the following document:

"LTE—The UMTS Long Term Evolution: from Theory to Practice" by SESIA Stefania, TOUFIK Issam, BAKER Mattew, Wiley, 2009.

Figure 2:
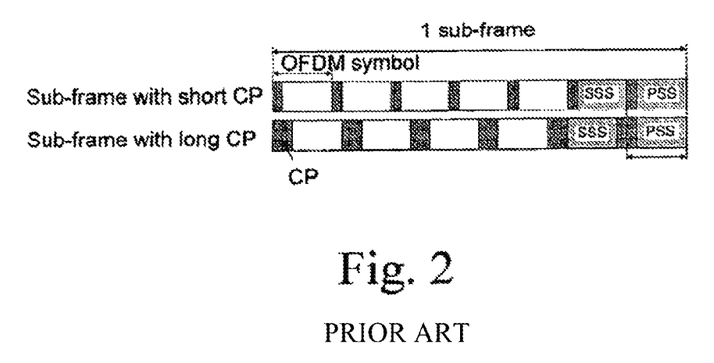
FIG. 2 illustrates the general structure of the LTE sub-frame comprising both the broadcasted PSS and SSS signals.

FIG. 2, recalls the general structure of the LTE sub-frame comprising both the broadcasted PSS and SSS signals.

As known by the skilled man, in order to synchronize, the UE has first to detect the PSS, which detection is then used for the purpose of the decoding of the SSS which provides the identification of the cell, such subsequent extraction being further required for the purpose of the decoding of the pilots or Reference Signals necessary for getting critical system parameters and also for achieving an accurate estimation of the channel.

While the decoding of the pilot signals allow the estimation of the channel, it may be useful that such channel estimation be allowable as soon as possible, and particularly during the first phase of the synchronization, at the extraction of the PSS.

Such channel estimation is highly desirable since it significantly improves the efficiency of the subsequent synchronization phases; In particular, the knowledge of the channel allows the designer the possibility to consider coherent SSS detection methods which are known to be more efficient.

It is therefore desirable to keep the channel estimation procedure as simple as possible in order to reduce complexity and the amount of digital processing resources required.

Such is the technical problem to solve by the present invention.

SUMMARY OF THE INVENTION

It is an object of the present invention to provide a new method for estimation the channel based on the Primary Synchronization Channel (PSS)

It is a further object of the present invention to provide a new method for performing Minimum Mean Square Error (MMSE) channel estimation based on the PSS signal with a low level of complexity.

It is still another object of the present invention to provide a receiver for a LTE communication network which achieves an estimation of the channel based on the PSS signal with a low level of complexity.

These and other objects of the invention are achieved by means of a method for estimating the channel in a Long Term Evolution (LTE) communication system, the method involving the step of extracting a Primary Synchronization Signal (PSS) from a received signal and further involving the step of spanning said PSS based Least Square (LS) channel estimation on the 64 sub-carriers so as to facilitate the MMSE channel estimation.

In one embodiment, there is provided the interpolation on the particular sub-carriers—namely d.c. and #-32—which are not allocated to the PSS.

Preferably, the d.c. sub-carrier is interpolated by averaging the two neighboring sub-carriers.

Preferably, the missing subcarrier-32 is interpolated by means of subcarrier #-31.

In one embodiment, the method involves the steps:
Perform a Least square (LS) channel estimation on the 62 sub-carriers containing the PSS
Interpolate the estimated channel in the subcarriers not allocated to said PSS to have an interpolated LS channel estimation on the 64 central sub-carriers;
Apply an Inverse DFT or inverse Fast Fourier Transform on the Interpolated channel estimation.
Extract the L first samples, with L corresponding to the length of the channel (also known as the channel delay spread);
multiply by $(F_L^H F_L + \sigma^2 C_h^{-1})^{-1}$
Zero-pad the resulting signal to length 64;
Apply a DFT or an FFT $F_L$ is the 64×L matrix, obtained by selecting the first L columns of the N×N DFT or FFT matrix, $\sigma^2$ is the noise variance and $C_h$ is the channel time domain impulse response covariance matrix.

Figure 5:
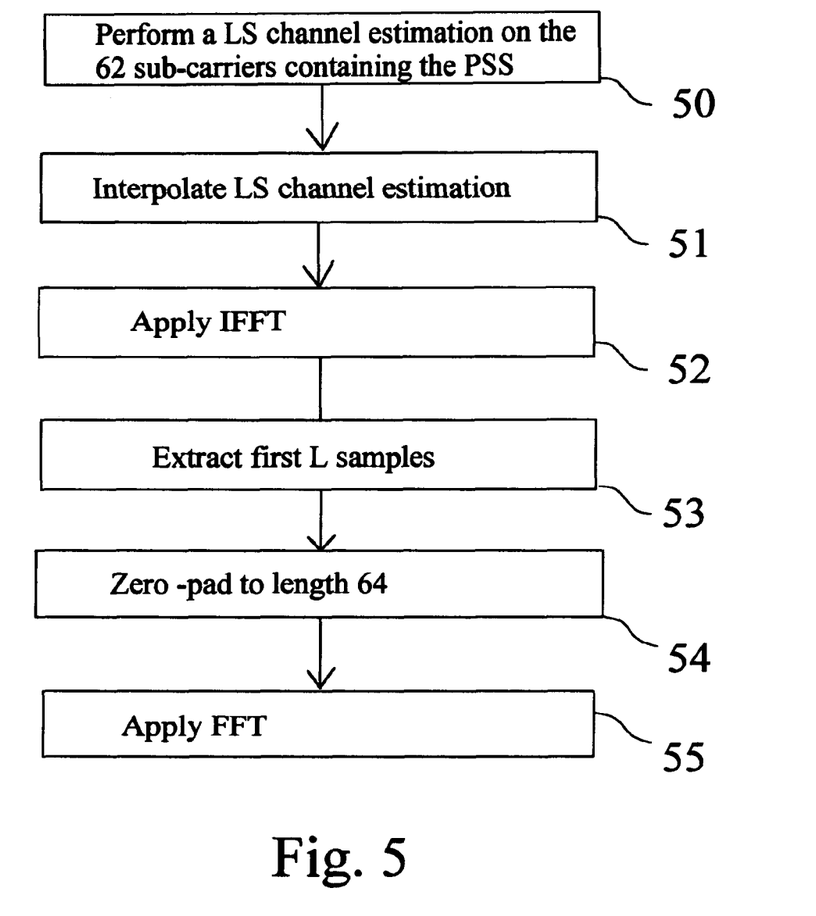
FIGS. 5-10 shows alternate embodiments corresponding to some situations where the knowledge of $C_h$, $\sigma^2$ or L is presumed to be not known.

Other embodiments correspond to some situations where the knowledge of $C_h$, $\sigma^2$ or L is presumed to be not known. Indeed, in another embodiment, the method involves the steps:
Perform a Least square (LS) channel estimation on the 62 sub-carriers containing the PSS (step 50)
reconstruct the LS channel estimation on the 64 central sub-carriers by interpolating on the two missing sub-carriers (step 51);
Applying an IFFT (or IDFT) to the interpolated channel estimation (step 52);
Extract the first L samples (step 53);
Zero-pad them to length 64 (step 54);
Perform a DFT or FFT of the result (step 55);

Alternatively, the method involves the steps of:
  Perform a Least square (LS) channel estimation on the 62 sub-carriers containing the PSS (step 60)
  reconstruct the LS channel estimation on the 64 central sub-carriers by interpolating on the two missing sub-carriers (step 61);
  Applying an IFFT to the interpolated channel estimation (step 62);
  Extract the first L samples (step 63);
  multiply the 1×L resulting vector by $(F_L^H F_L + \sigma^2 I_L)^{-1}$, where $I_L$ is the identity matrix of dimension L (step 64);
  Zero-pad the resulting signal to length 64 (step 65);
  Perform a DFT or FFT of the result (step 66).
In another variant, the method may involve the steps of:
  Perform a Least square (LS) channel estimation on the 62 sub-carriers containing the PSS (step 70)
  reconstruct the LS channel estimation on the 64 central sub-carriers by interpolating on the two missing sub-carriers (step 71);
  Applying an IFFT to the interpolated channel estimation (step 72);
  Extract the first samples corresponding to the Cyclic Prefix (CP) length (step 73);
  Zero-pad them to length 64 (step 74);
  Perform a DFT or an FFT of the result (step 75).
Alternatively, the method involves the steps of:
  Perform a Least square (LS) channel estimation on the 62 sub-carriers containing the PSS (step 80)
  reconstruct the LS channel estimation on the 64 central sub-carriers by interpolating on the two missing sub-carriers (step 81);
  Applying an IFFT to the interpolated channel estimation (step 82);
  Keep the samples corresponding to the existence of non-zero taps in $C_h$ and put zeros elsewhere (step 83);
  Perform an FFT of the result (step 84).
In still another variant, the method involves the steps of:
  Perform a Least square (LS) channel estimation on the 62 sub-carriers containing the PSS (step 90)
  reconstruct the LS channel estimation on the 64 central sub-carriers by interpolating on the two missing sub-carriers (step 91);
  Applying an IFFT to the interpolated channel estimation (step 92);
  Keep the N strongest samples (comparison is made on the samples' magnitude or power) and put zeros elsewhere. (The strongest may also be limited to the samples in CP) (step 93).
  Perform a DFT or an FFT of the result (step 94).
Another embodiment of the method involves the steps of:
  Perform a Least square (LS) channel estimation on the 62 sub-carriers containing the PSS (step 100)
  reconstruct the LS channel estimation on the 64 central sub-carriers by interpolating on the two missing sub-carriers (step 101);
  Applying an IFFT to the interpolated channel estimation (step 102).
  Within the first CP_length samples, detect the sample with maximum power (step 103). (CP_length being the length of the Cyclic Prefix (CP) in samples)
  Keep only samples with power exceeding a threshold defined w.r.t the maximum power (may also be limited to only the samples in the CP)) (step 104).
  Perform a DFT or a FFT of the result (step 105).
The invention also provides a Receiver for a LTE digital communication network comprising means for extracting a Primary Synchronization Signal (PSS) from a received signal and further involving means for spanning said PSS on the 64 sub-carriers so as to facilitate the channel estimation.

DESCRIPTION OF THE DRAWINGS

Other features of one or more embodiments of the invention will best be understood by reference to the following detailed description when read in conjunction with the accompanying drawings.

DESCRIPTION OF THE PREFERRED EMBODIMENT

The invention will be particularly described in relation with the Long Term Evolution (LTE) standard which is the next step of the evolution of cellular digital wireless communications, but it should be clear that this is only one particular embodiment and application of the invention and the invention may be used in any system based on a OFDM modulation with, the OFDM modulation is widely spread in many existing standards (such as DAB, DVB-T, WiMAX, IEEE 802.16, ADSL, WLAN IEEE 802.11a/g, etc.) and expected to be used in many future developing standards. As known by the skilled man, the OFDM converts a broadband frequency-selective channel into a multiplicity of parallel narrow-band single channels. This is achieved by means of the insertion of a guard interval (so-called Cyclic Prefix CP) between the individual symbols. Such guard interval is assumed to be temporally long enough to compensate for jitter, i.e. the variation of the delays experienced by the transmitted OFDM symbols through the channel. This prevents the appearance of inter-symbol interference (ISI).

The PSS and SSS signals are sequences of length 62 mapped to the central 62 sub-carriers (not including the d.c.) independently of the transmission bandwidth, and which are generated from frequency-domain Zadoff-Chu sequence according to the following formula:

$$d_M(n) = \begin{cases} e^{-j\frac{\pi M n(n+1)}{63}} & n = 0, 1, \ldots, 30 \\ e^{-j\frac{\pi M (n+1)(n+2)}{63}} & n = 31, 32, \ldots, 61 \end{cases}$$

Where M is the ZC sequence root. Three different PSS identities (i.e. ZC sequence roots) are possible. The selected roots for the LTE PSS sequences are M=25, 29, 34.

Figure 3:
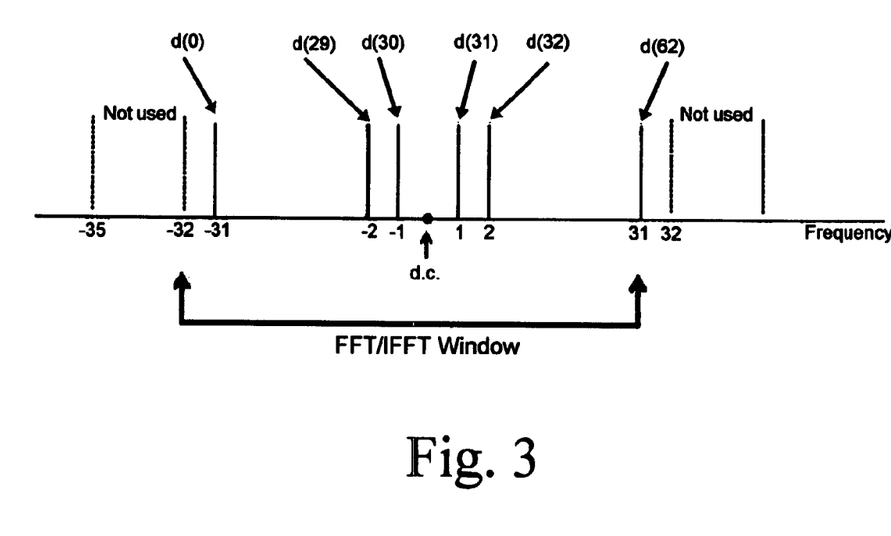
FIG. 3 illustrates the PSS mapping to sub-carriers.

The Primary Synchronization Signals sequence mapping to sub-carriers is particularly illustrated in FIG. 3.

The transmitted PSS sequence can be detected by performing a correlation of the received signal against the three possible PSS sequences and by detecting the correlation peak. The detection of the sequence identity and time location allows the OFDM symbol synchronization and the cell ID decoding.

Once the identity and location of the PSS is identified, the PSS can be used as a pilot sequence allowing channel estimation that can be used for the SSS detection. This is made possible by the fact that the SSS and PSS are mapped both to the (same) central sub-carriers, and that the OFDM symbols containing the PSS and the SSS are consecutive as shown in FIG. 2.

Let Y be the vector of length 62 of the received signal in the 62 sub-carriers corresponding to the PSS.

The LS (Least Square) channel estimator at the PSS positions is given by the following vector:

$$\hat{H}_{LS}=[\hat{H}_{LS}[1],\ldots,\hat{H}_{LS}[62]]^T$$

Given by $$\hat{H}_{LS}[k]=Y[k]\cdot d^*[k]$$

where d[k] is the transmitted PSS symbol at position k.

The MMSE (Minimum Mean Square Error) estimator on the 64 central sub-carriers can be expressed as $$\hat{H}_{MMSE}=F_L(F_P{}^H F_P+\sigma^2 C_h^{-1})^{-1}F_P{}^H \hat{H}_{LS}$$

where $F_p$ is the 62×L matrix, obtained by selecting the rows corresponding to the PSS positions and the first L columns of the 64×64 Discrete Fourier Transform (DFT) matrix. $F_L$ is the matrix which is obtained by selecting the first L columns of the 64×64 DFT matrix, and $\sigma^2$ being the noise variance;

$C_h$ being the channel time domain impulse response covariance matrix.

Because of the truncated structure of $F_p$ and $F_L$, the MMSE estimator shows a significant complexity due to the two following grounds:

The matrix $F_P{}^H F_p+\sigma^2 C_h^{-1}$ is not diagonal and its inversion requires significant computing resources;

The computation of the product $F_P{}^H \hat{H}_{LS}$ implies a matrix multiplication.

Indeed, it has been discovered that those two sources of complexity can be avoided if the PSS was spanning the 64 central sub-carriers. Indeed, with such assumption, one may write:

$F_P = F_L$

The matrix $F_P{}^H F_p+\sigma^2 C_h^{-1}$ then becomes diagonal and thus easily invertible.

$F_P{}^H \hat{H}_{LS}$ reduces to the IFFT of $\hat{H}_{LS}$.

On the basis of such observations, the inventors have designed a new and advantageous method which allows, with a low level of complexity, to generate an MMSE estimation of the channel on the sole basis of the PSS signal.

Figure 4:
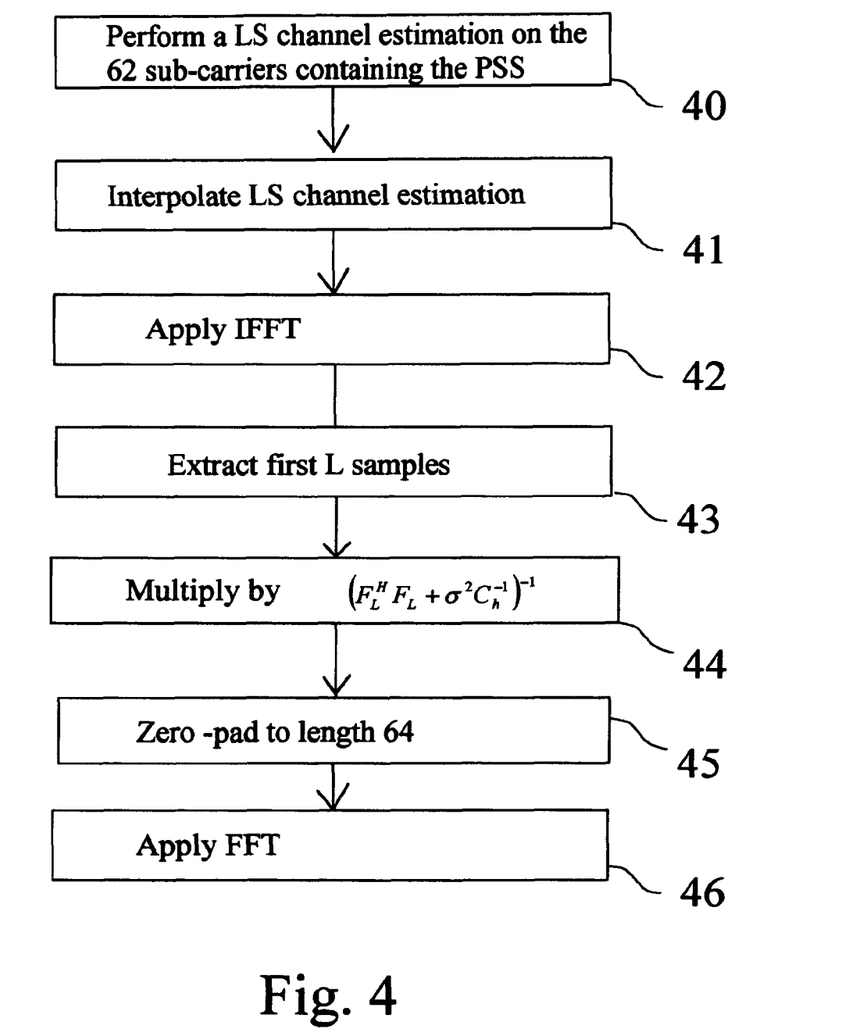
FIG. 4 illustrates a first embodiment of the channel estimating method.

With respect to FIG. 4, there is now described one embodiment of this method which can be advantageously executed into a receiver of a LTE User Equipment.

In a step 40, the method involves LS channel estimation on the 62 sub-carriers containing the PSS. $\hat{H}_{LS}$ denotes the estimated vector.

In a step 41, the method involves an interpolation based on reconstructing the LS channel estimation in the two missing sub-carriers (namely sub-carriers #-32 and d.c.) so that $\hat{H}_{LS}$ shows to be spanning the 64 central sub-carriers, which is a condition for a significant reduction in the complexity of the MMSE (Minimum Mean Square Error) estimation.

Clearly, different embodiments may be considered in step 41 for the purpose is of performing such reconstruction. For instance, this can be achieved by any appropriate function (for example a linear combination) of the channel estimation in the adjacent sub-carriers.

In one embodiment, the channel estimation in the d.c. sub-carrier is made by averaging the two neighboring sub-carriers (i.e. neighbor in the left and neighbor in the right with respect to the central d.c. position).

In another embodiment, the channel estimation in the sub-carrier at the edge (i.e. subcarrier-32), is set equal to the channel estimation in the adjacent sub-carrier (i.e. sub-carrier-31).

After that reconstruction of the LS channel estimation, the method involves the following steps:

step 42: apply an IFFT;

step 43, extract the L first samples, L corresponding to the length of the channel);

step 44, multiply by $(F_L{}^H F_L+\sigma^2 C_h^{-1})^{-1}$ step 45: Zero-pad the resulting signal to length 64.

step 46 Apply an FFT

It can be seen that, thanks to the interpolation which was introduced on the basis of the reconstruction of the LS channel estimation (by means of d.c. and #-32 subcarriers), step 44—which requires the inversion of a matrix—is very simple to carry out since the matrix shows to be diagonal and, furthermore, of a size L×L.

Therefore, with a channel length being equal to 5 (5 taps of the impulse response of the channel), the above described method only requires the inversion of a 5×5 diagonal matrix which is immediate.

Also matrix multiplications are replaced by IFFT and FFT (or IDFT and DFT) operations which allows a considerable additional complexity reduction.

As a consequence, the interpolation step 41 shows to be very advantageous since it allows to significantly reduce the level of the complexity of the MMSE channel estimation.

FIGS. 5-10 shows different embodiments corresponding to some situations where the knowledge of $C_h$, $\sigma^2$ or L is presumed to be not known. In such case, the following approximations can be made.

With respect to FIG. 5, there is now described a second embodiment where $C_h$, $\sigma^2$ are assumed to be not known. Conversely, the knowledge of L is available.

Figure 6:
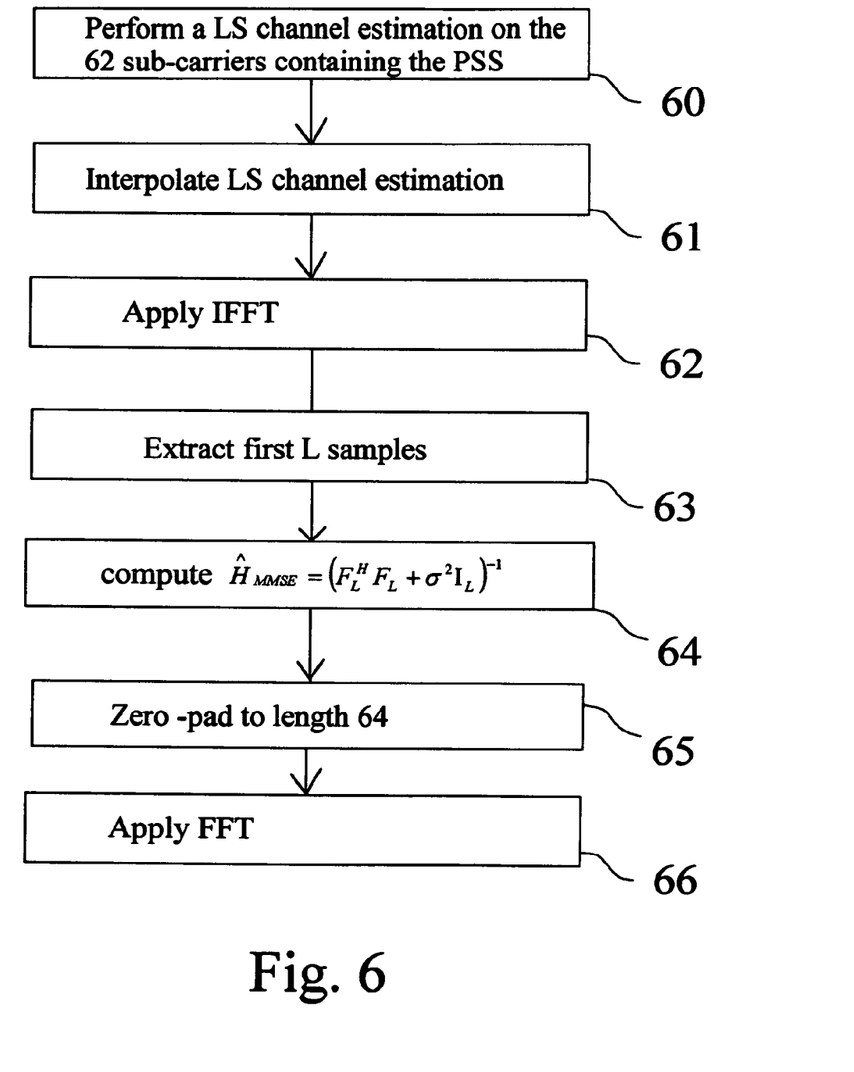

In that case, the method comprises the following steps:

Perform LS channel estimation on the 62 sub-carriers containing the PSS (Step 50)

reconstruct the LS channel estimation on the 64 central subcarriers by interpolating on the two missing sub-carriers (step 51);

Applying an IFFT to the interpolated channel estimation (step 52);

Extract the first L samples (step 53);

Zero-pad them to length 64 (step 54);

Perform an FFT of the result (step 55);

With respect to FIG. 6, there is now described a third embodiment where $C_h$ is not known and only knowledge of $\sigma^2$ and L is available.

In that case, the method achieves the channel estimation as follows:

Perform LS channel estimation on the 62 sub-carriers containing the PSS (Step 60)

reconstruct the LS channel estimation on the 64 central subcarriers by interpolating on the two missing sub-carriers (step 61);

Applying an IFFT to the interpolated channel estimation (step 62);

Extract the first L samples (step 63);

multiply by $(F_L{}^H F_L+\sigma^2 I_L)^{-1}$, where $I_L$ is the identity matrix of dimension L (step 64);

Zero-pad the resulting signal to length 64 (step 65);

Perform an FFT of the result (step 66).

Figure 7:
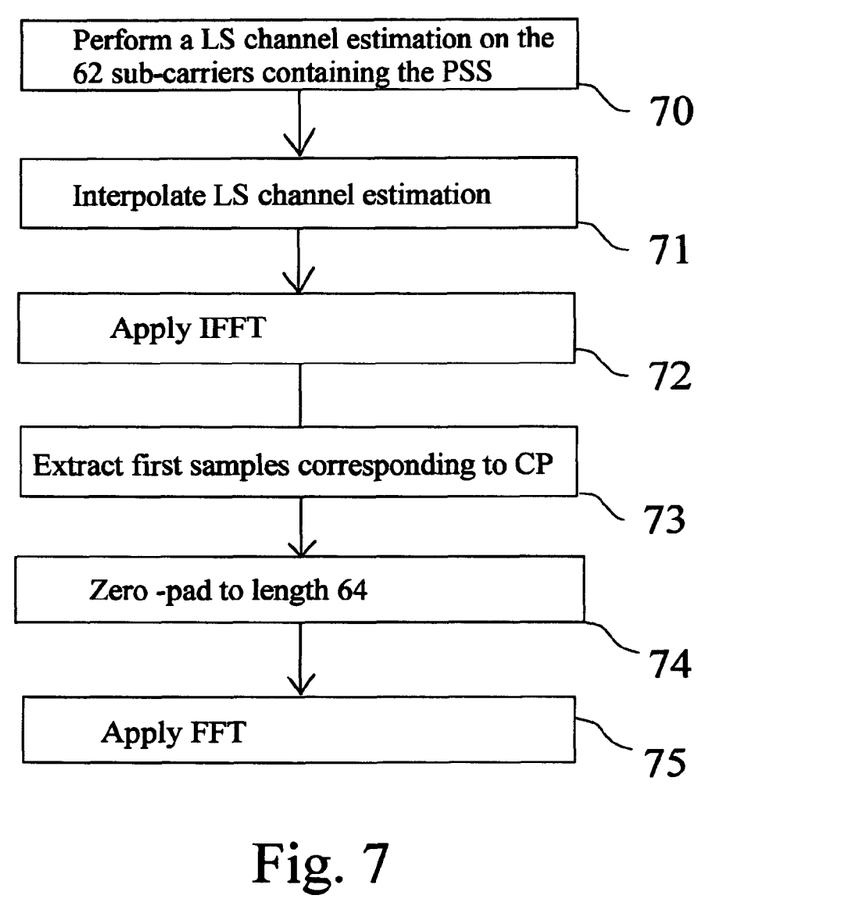

With respect to FIG. 7, there is now described a fourth embodiment where L is assumed to be unknown, and in which case the channel estimation can be obtained by the following steps:

Perform LS channel estimation on the 62 sub-carriers containing the PSS (Step 70)

reconstruct the LS channel estimation on the 64 central subcarriers by interpolating on the two missing sub-carriers (step 71);

Applying an IFFT to the interpolated channel estimation (step 72);

Extract the first samples corresponding to the Cyclic Prefix (CP) length (step 73);

Zero-pad them to length 64 (step 74);

Perform an FFT of the result (step 75).

Figure 8:
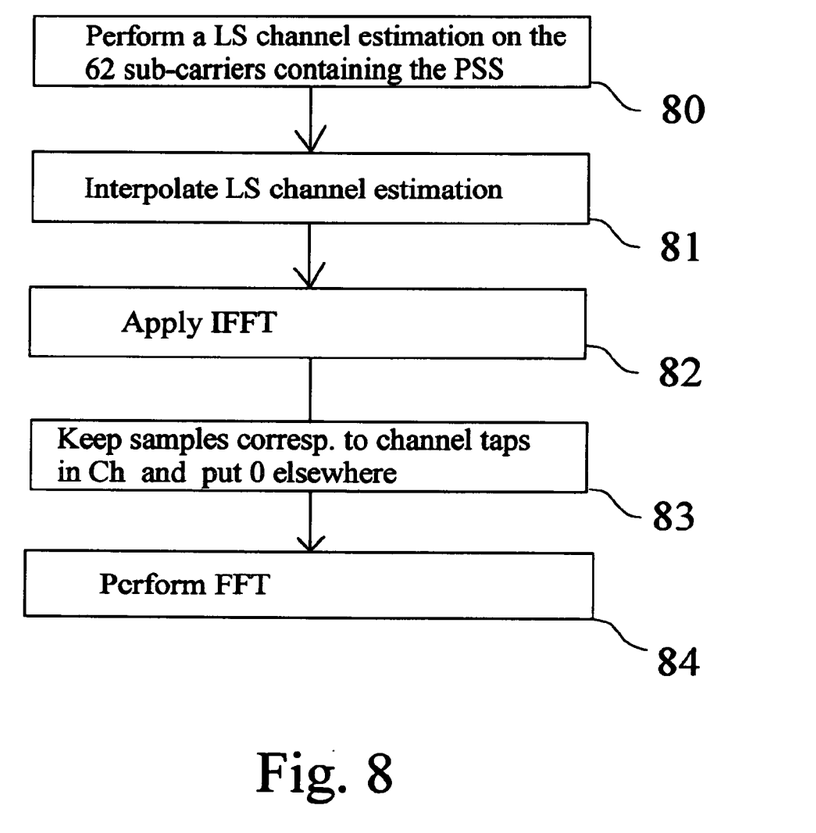
Figure 9:
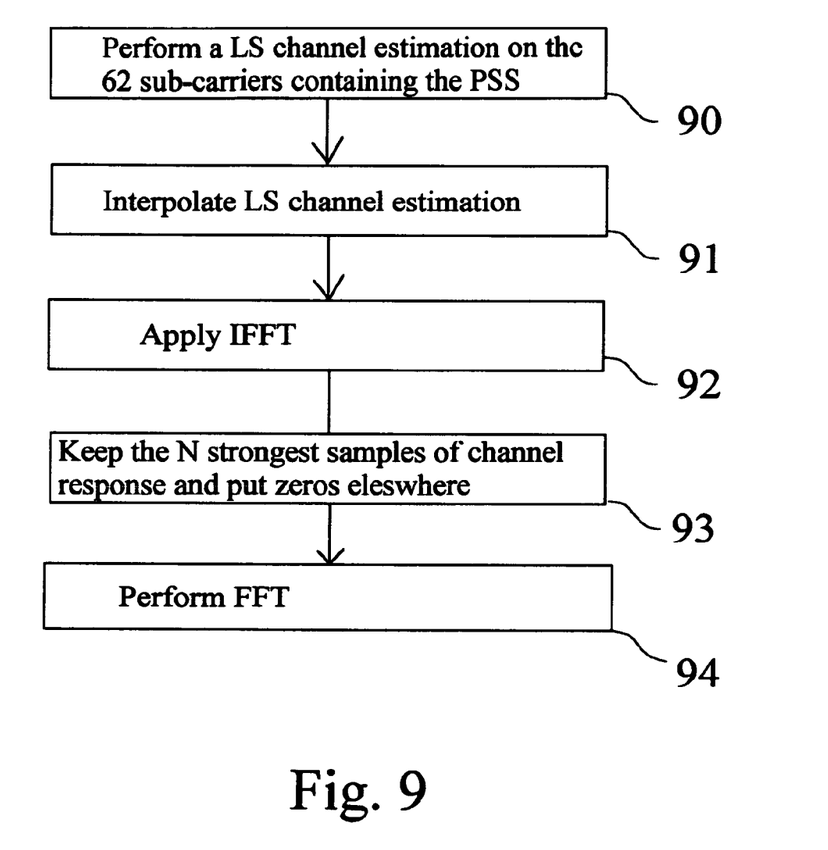

With respect to FIG. 8, there is now described a fifth embodiment where $C_h$ is assumed to be known or at least the non-zero element positions of $C_h$ are known, and the method involves the steps:

Perform LS channel estimation on the 62 sub-carriers containing the PSS (Step 80)

reconstruct the LS channel estimation on the 64 central sub-carriers by interpolating on the two missing sub-carriers (step 81);

Applying an IFFT to the interpolated channel estimation (step 82);

Keep the samples corresponding to the existence of non-zero taps in $C_h$ and put zeros elsewhere (step 83);

Perform an FFT of the result (step 84);

With respect to FIG. 9, there is now described a sixth embodiment of a channel estimation involving the steps of:

Perform LS channel estimation on the 62 sub-carriers containing the PSS (Step 90)

reconstruct the LS channel estimation on the 64 central sub-carriers by interpolating on the two missing sub-carriers (step 91);

Applying an IFFT to the interpolated channel estimation (step 92);

Keep the N strongest samples (comparison is made on the samples' magnitude or power) and put zeros elsewhere. (The strongest may also be limited to the samples in CP) (step 93).

Perform an FFT of the result (step 94).

Figure 10:
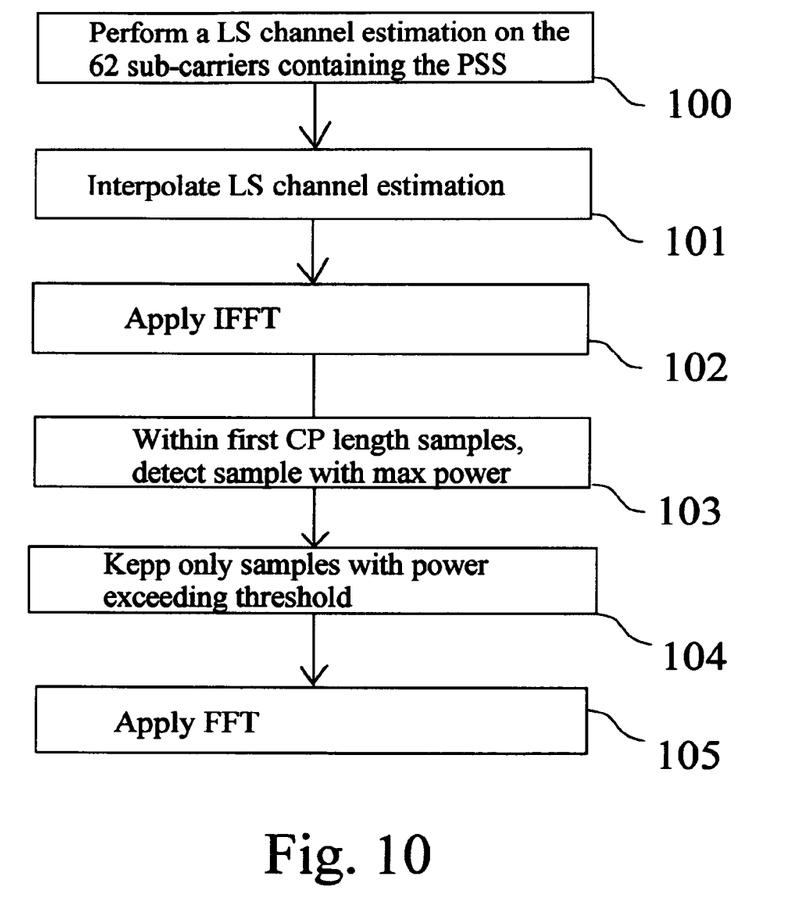

At last, FIG. 10 illustrates a seventh embodiment of a channel estimation involving the steps of:

Perform LS channel estimation on the 62 sub-carriers containing the PSS (Step 100)

reconstruct the LS channel estimation on the 64 central sub-carriers by interpolating on the two missing sub-carriers (step 101);

Applying an IFFT to the interpolated channel estimation (step 102).

Within the first CP_length samples, detect the sample with maximum power (step 103).

Keep only samples with power exceeding a threshold defined w.r.t the maximum power (may also be limited to only the samples in the CP)) (step 104).

Perform an FFT of the result (step 105).

The different embodiments which were described above illustrate the great generality of the method which clearly reduces the complexity of the channel estimation thanks to the reconstruction of the LS channel estimation in the two missing sub-carriers (namely sub-carriers #-32 and d.c.) so that $\hat{H}_{LS}$ shows to be spanning the 64 central sub-carriers.

Such method clearly allows an effective channel estimation at the very early stage of the synchronization procedure, namely during the extraction of the PSS, without requiring great amount of digital resources.

Such channel estimation can then be used for subsequent operations, e.g. for the detection of the SSS.

The invention claimed is:

1. A method for estimating a channel in a Long Term Evolution (LTE) communication system, said method comprising:

extracting a Primary Synchronization Signal (PSS) from a received signal, and spanning, on 64 sub-carriers, a Least Square (LS) channel estimation of said PSS performed over 62 sub-carriers carrying the PSS, to facilitate a channel estimation.

2. The method according to claim 1, wherein said spanning is performed by interpolating two sub-carriers which are not allocated to said PSS.

3. The method according to claim 2, wherein at least one of the two sub-carriers is interpolated by averaging two neighboring sub-carriers.

4. The method according to claim 2, wherein at least one of the two sub-carriers is interpolated by means of an adjacent one of the 62 subcarriers.

5. The method according to claim 1, wherein said spanning comprises:

interpolating the LS channel estimation on two sub-carriers not allocated to said PSS;

applying an inverse Discrete Fourier Transform (DFT) or an inverse Fast Fourier Transform (IFFT) to the interpolated LS Channel estimation;

extracting a first L samples of the inverse Fast Fourier Transformed, interpolated LS channel estimation, with L corresponding to a length of the channel;

multiplying the extracted first L samples with $F_L{}^H F_L + \sigma^2 C_h{}^{-1})^{-1}$ where $F_L$ is a matrix which is obtained by selecting first L columns of a 64×64 IDFT matrix, $\sigma$ being a variance of noise; and $C_h$ being a channel time domain impulse response covariance matrix;

zero-padding the resulting signal to a length of 64; and applying a DFT or an FFT to the zero-padded signal.

6. The method according to claim 1, wherein said spanning comprises:

reconstructing the LS channel estimation on the 64 sub-carriers by interpolating on two missing sub-carriers;

applying an IFFT to the interpolated LS channel estimation;

extracting a first L samples of the inverse Fast Fourier Transformed, interpolated LS channel estimation;

zero-padding the first L samples to length 64; and performing a DFT or a FFT of a result of the zero-padding.

7. The method according to claim 1, wherein said spanning comprises:

reconstructing the LS channel estimation on the 64 central sub-carriers by interpolating on two missing sub-carriers;

applying an IFFT to the interpolated LS channel estimation;

extracting a first L samples of the inverse Fast Fourier Transformed, interpolated LS channel estimation, with L corresponding to a length of a channel;

multiplying the extracted first L samples with $(F_L{}^H F_L + \sigma^2 I_L)^{-1}$, where $I_L$ is the identity matrix of dimension L;

zero-padding a signal resulting from multiplying to length 64; and performing a DFT or FFT of the zero-padded signal.

8. The method according to claim 1, wherein said spanning comprises:
- reconstructing the LS channel estimation on the 64 central sub-carriers by interpolating on two missing sub-carriers;
- applying an IFFT to the interpolated LS channel estimation;
- extracting first samples corresponding to a Cyclic Prefix (CP) length;
- zero-padding the extracted first samples to length 64; and
- performing a DFT or an FFT of a result of zero-padding.

9. The method according to claim 1, wherein said spanning comprises:
- reconstructing the LS channel estimation on the 64 sub-carriers by interpolating on two missing sub-carriers;
- applying an IFFT to the interpolated LS channel estimation;
- modifying a result of the IFFT to keep samples corresponding to non-zero taps in $C_h$ and putting zeros at samples not corresponding to non-zero taps in $C_h$; and
- performing an FFT of the modified result of the IFFT.

10. The method according to claim 1, wherein said spanning comprises:
- reconstructing the LS channel estimation on the 64 sub-carriers by interpolating on two missing sub-carriers;
- applying an IFFT to the interpolated LS channel estimation;
- keeping N strongest samples of the IFFT interpolated channel estimation; and
- performing a DFT or a FFT of a result of keeping.

11. The method according to claim 1, wherein said spanning comprises:
- reconstructing the LS channel estimation on the 64 sub-carriers by interpolating on two missing sub-carriers;
- applying an IFFT to the interpolated LS channel estimation;
- detecting a sample with maximum power within first CP length samples;
- modifying a result of the IFFT to keep only samples with power exceeding a threshold defined with respect to the maximum power; and
- performing a DFT or a FFT of the modified result of the IFFT.

12. A receiver for a LTE digital communication network for performing the method according to claim 1.

13. A Mobile User Equipment comprising a receiver as defined in claim 12.

14. A receiver for a LTE digital communication network, the receiver comprising:
- means for extracting a Primary Synchronization Signal (PSS) from a received signal; and
- means for spanning, on 64 sub-carriers, a LS channel estimation of said PSS to facilitate a Minimum Mean Square Error (MMSE) channel estimation.

15. The receiver according to claim 14, wherein said means for spanning interpolate two sub-carriers which are not allocated to said PSS.

* * * * *